(12) United States Patent
Li

(10) Patent No.: US 8,472,510 B2
(45) Date of Patent: Jun. 25, 2013

(54) RECEIVER AND METHOD FOR EQUALIZING RECEIVED SIGNAL

(75) Inventor: Yi-Lin Li, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 47 days.

(21) Appl. No.: 13/191,480

(22) Filed: Jul. 27, 2011

(65) Prior Publication Data

US 2012/0027071 A1   Feb. 2, 2012

(30) Foreign Application Priority Data

Jul. 27, 2010   (TW) .............................. 99124696 A

(51) Int. Cl.
*H04L 27/01* (2006.01)
(52) U.S. Cl.
USPC ........................... 375/231; 375/232; 375/350
(58) Field of Classification Search
USPC .......................................... 375/231, 232, 350
See application file for complete search history.

(56) References Cited

U.S. PATENT DOCUMENTS

| | | | |
|---|---|---|---|
| 6,628,704 B1* | 9/2003 | Long et al. | 375/219 |
| 2003/0007554 A1* | 1/2003 | Birru | 375/233 |
| 2004/0001541 A1* | 1/2004 | Haghighat | 375/232 |

\* cited by examiner

*Primary Examiner* — Kenneth Lam
*Assistant Examiner* — Michael Neff
(74) *Attorney, Agent, or Firm* — McClure, Qualey & Rodack, LLP

(57) ABSTRACT

A receiver includes a discrete Fourier transform unit, a frequency-domain equalizer, an inverse discrete Fourier transform unit, a time-domain equalizer and an output circuit. The discrete Fourier transform unit is utilized for performing a discrete Fourier transform operation upon a received signal to generate a frequency-domain signal. The frequency-domain equalizer is utilized for equalizing the frequency-domain signal to generate an equalized frequency-domain signal. The inverse discrete Fourier transform unit is utilized for performing an inverse discrete Fourier transform operation upon the equalized frequency-domain signal to generate a first equalized time-domain signal. The time-domain equalizer is utilized for equalizing the received signal to generate a second equalized time-domain signal. The output circuit is utilized for generating a third equalized time-domain signal according to the first equalized time-domain signal and the second equalized time-domain signal.

16 Claims, 6 Drawing Sheets

RECEIVER AND METHOD FOR EQUALIZING RECEIVED SIGNAL

BACKGROUND

1. Technical Field

The disclosure relates to a receiver and an associated method.

2. Description of the Prior Art

In a communication system, a receiver generally has an equalizer which cancels inter-symbol interference (ISI) of a received signal, where the equalizer can be implemented by a frequency-domain equalizer or a time-domain equalizer. The frequency-domain equalizer requires fewer multipliers than the time-domain equalizer, but the tap coefficients of the frequency-domain equalizer are updated slowly: generally, once every plurality of symbols (e.g. 2000 symbols). For the time-domain equalizer, the tap coefficients are updated quickly, but the chip area of the time-domain equalizer is large because it requires more multipliers than the frequency-domain equalizer. Therefore, how to provide an equalizer which has few multipliers but also has better signal processing quality is an important topic in this field.

BRIEF SUMMARY

It is therefore an objective of the disclosure to provide an equalizer using a time-domain equalizer and a frequency-domain equalizer to equalize a received signal at the same time, wherein this equalizer has few multipliers and also has better signal processing quality, to solve the above-mentioned problems.

In an exemplary embodiment, a receiver comprises a discrete Fourier transform unit, a frequency-domain equalizer, an inverse discrete Fourier transform unit, a time-domain equalizer and an output circuit. The discrete Fourier transform unit is utilized for performing a discrete Fourier transform operation upon a received signal to generate a frequency-domain signal. The frequency-domain equalizer is utilized for equalizing the frequency-domain signal to generate an equalized frequency-domain signal. The inverse discrete Fourier transform unit is utilized for performing an inverse discrete Fourier transform operation upon the equalized frequency-domain signal to generate a first equalized time-domain signal. The time-domain equalizer is utilized for equalizing the received signal to generate a second equalized time-domain signal. The output circuit is utilized for generating a third equalized time-domain signal according to the first equalized time-domain signal and the second equalized time-domain signal.

In another exemplary embodiment, a method for equalizing a received signal comprises: performing a discrete Fourier transform operation upon a received signal to generate a frequency-domain signal; providing a frequency-domain equalizer to equalize the frequency-domain signal to generate an equalized frequency-domain signal; performing an inverse discrete Fourier transform operation upon the equalized frequency-domain signal to generate a first equalized time-domain signal; providing a time-domain equalizer to equalize the received signal to generate a second equalized time-domain signal; and generating a third equalized time-domain signal according to the first equalized time-domain signal and the second equalized time-domain signal.

These and other objectives of the disclosure will no doubt become obvious to those of ordinary skill in the art after reading the following detailed descriptions of the embodiments that are illustrated in the various figures and drawings.

DETAILED DESCRIPTION

Figure 1:
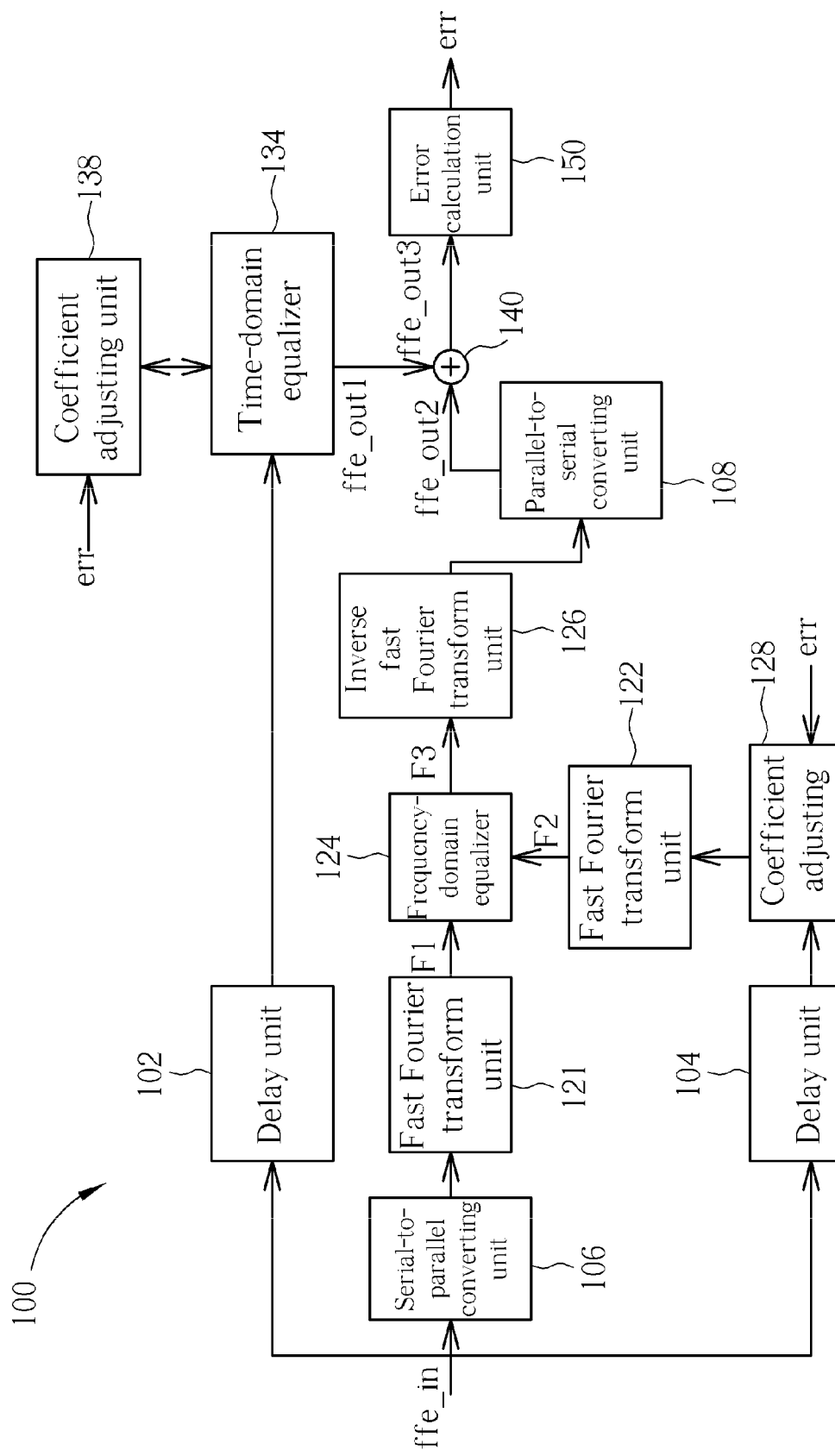
FIG. 1 is a diagram illustrating a receiver according to a first embodiment.

Please refer to FIG. 1, which illustrates a receiver 100 according to a first embodiment. As shown in FIG. 1, the receiver 100 includes two delay units 102 and 104, a serial-to-parallel converting unit 106, a parallel-to-serial converting unit 108, two discrete Fourier transform units (in this embodiment, two fast Fourier transform units 121 and 122 serve as the two discrete Fourier transform units), a frequency-domain equalizer 124, an inverse discrete Fourier transform units (in this embodiment, an inverse fast Fourier transform unit 126 serves as the inverse discrete Fourier transform unit), two coefficient adjusting units 128 and 138, a time-domain equalizer 134, an output circuit (in this embodiment, an adder 140 serves as the output circuit), and an error calculation unit 150. In addition, the coefficient adjusting unit 128 includes a storage unit (not shown) which stores a plurality of tap coefficients of the frequency-domain equalizer 124; and the coefficient adjusting unit 138 includes a storage unit (not shown) which stores a plurality of tap coefficients of the time-domain equalizer 134.

In this embodiment, the frequency-domain equalizer 124 and the time-domain equalizer 134 have the same number of taps, and only a portion of taps of both the frequency-domain equalizer 124 and the time-domain equalizer 134 are updated/adjusted, wherein tap coefficients of the frequency-domain equalizer 124 that are updated/adjusted and the tap coefficients of the time-domain equalizer 134 that are updated/adjusted have different tap indexes. For example, assuming that both the frequency-domain equalizer 124 and the time-domain equalizer 134 have 400 taps, the taps having the tap indexes Tap_FE_1-Tap_FE_200 and Tap_FE_301-Tap_FE_400 of the frequency-domain equalizer 124 can be set to be updated/adjusted, and the taps having the tap indexes Tap_FE_201-Tap_FE_300 are set to be a fixed value "0"; i.e. the taps having the tap indexes Tap_FE_201-Tap_FE_300 will not be used for operations. In addition, the taps having the tap indexes Tap_TE_201-Tap_TE_300 of the time-domain equalizer 134 can be set to be updated/adjusted, and the taps having the tap indexes Tap_TE_1-Tap_TE_200 and Tap_TE_301-Tap_TE_400 are set to be a fixed value "0"; i.e. the taps having the tap indexes Tap_TE_1-Tap_TE_200 and Tap_TE_301-Tap_TE_400 will not be used for operations.

Figure 2:
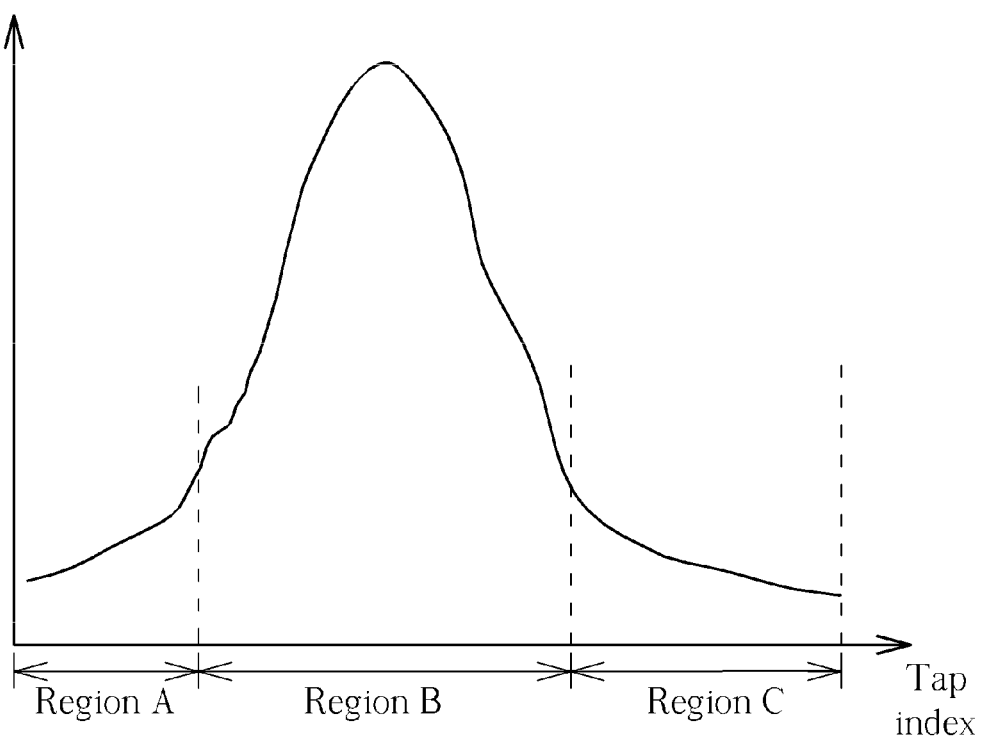
FIG. 2 is a diagram showing the time-domain equalizer and the frequency-domain equalizer shown in FIG. 2 corresponding to different regions of a frequency response.

In addition, the taps of the time-domain equalizer 134 to be adjusted correspond to a region B shown in FIG. 2, whose tap coefficient changing speed is relatively fast; and the taps of the frequency-domain equalizer 124 to be adjusted correspond to region A and region C shown in FIG. 2, whose tap coefficient changing speed is relatively slow.

In the following descriptions concerning the receiver 100, it is assumed that only the taps having the tap indexes Tap_FE_1-Tap_FE_200 and Tap_FE_301-Tap_FE_400 of the frequency-domain equalizer 124 are to be updated/adjusted, and only the taps having the tap indexes Tap_TE_201-Tap_TE_300 of the time-domain equalizer 134 are to be updated/adjusted; however, this is not meant to be a limitation of the disclosure. First, the time-domain equalizer 134 equalizes an input signal ffe_in (e.g. performs convolution upon the input signal ffe_in and the tap coefficients of the time-domain equalizer 134) passing through the delay unit 102 to generate a first equalized time-domain signal ffe_out1. The formula is as follows:

$$\text{ffe\_out1}[n] = \sum_{k=200}^{299} \text{ffe\_in}[n - D_f - k]\text{ffe\_coeff1}_n[k],$$

where n is a symbol index, $D_f$ is a delay amount of the delay unit 102, and ffe_coeff1$_n$[k] is a tap coefficient of the time-domain equalizer 134 when the symbol index is n.

The serial-to-parallel converting unit 106 and the fast Fourier transform unit 121 performs a serial-to-parallel converting operation and a fast Fourier transform operation upon the input signal ffe_in to generate a frequency-domain signal F1, and the fast Fourier transform unit 122 performs a fast Fourier transform operation upon the tap coefficients of the frequency-domain equalizer 124 (these tap coefficients are stored in the storage unit of the coefficient adjusting unit 128) to generate a frequency-domain signal F2. Then, the frequency-domain equalizer 124 equalizes the frequency-domain signal F1 to generate an equalized frequency-domain signal F3 (e.g. multiplies the frequency-domain signals F1 and F2 to generate the equalized frequency-domain signal F3). Then, the inverse fast Fourier transform unit 126 and the parallel-to-serial converting unit 108 perform an inverse fast Fourier transform operation and a parallel-to-serial converting operation upon the equalized frequency-domain signal F3 to generate a second equalized time-domain signal ffe_out2. The second equalized time-domain signal ffe_out2 is as follows:

$$\text{ffe\_out2}[n] = \sum_{k=0}^{199} \text{ffe\_in}[n - D_f - k]\text{ffe\_coeff2}_m[k] +$$

$$\sum_{k=300}^{399} \text{ffe\_in}[n - D_f - k]\text{ffe\_coeff2}_m[k],$$

where n is a symbol index, $D_f$ is a delay amount of the delay unit 104, ffe_coeff2$_m$[k] is a tap coefficient of the frequency-domain equalizer 124, $$m = \left\lfloor \frac{n}{N_u} \right\rfloor,$$

and $N_u$ is an equivalent block length of the linear convolution when a circular convolution is performed.

Figure 3:
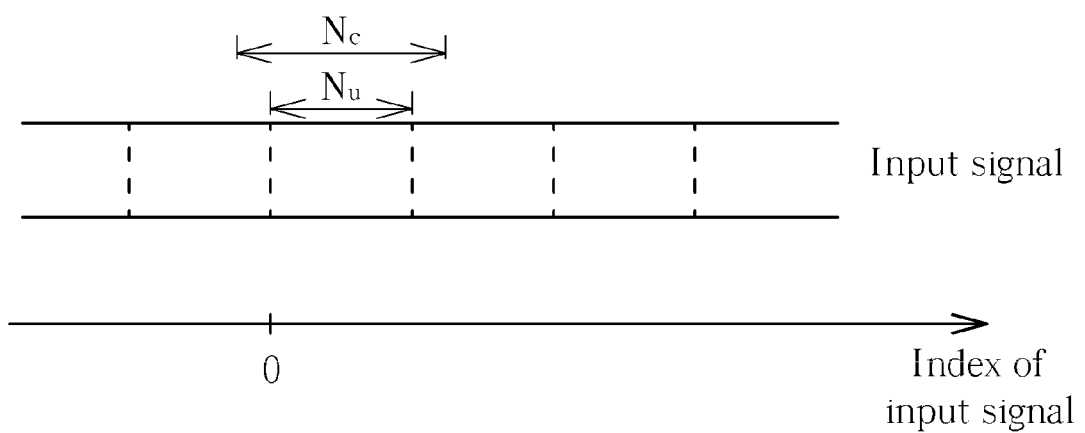
FIG. 3 is a diagram showing an equivalent block length of the linear convolution when a circular convolution is performed.

FIG. 3 shows the parameter $N_u$. As shown in FIG. 3, Nc is the block length of the circuit convolution, and $N_u$ is the block length of the linear convolution, where Nc>$N_u$ and Nc includes $N_u$.

Then, the adder 140 adds the first equalized time-domain signal ffe_out1 to the second equalized time-domain signal ffe_out2 to generate a third equalized time-domain signal ffe_out3 as follows:

$$\text{ffe\_out3}[n]=\text{ffe\_out1}[n]+\text{ffe\_out2}[n]$$

The error calculation unit 150 generates a plurality of error values err according to the third equalized time-domain signal ffe_out3, where the error values err are used by the coefficient adjusting unit 138 to adjust the coefficient ffe_coeff1$_{n+1}$[k] of the time-domain equalizer 134. The formula is as follows:

$$\text{ffe\_coeff}1_{n+1}[k]=\text{ffe\_coeff}1_n[k]+u_{n,k}\text{err}[n]\text{ffe\_in}[n-D_f-k], k=200\sim299,$$

where $u_{n,k}$ is a step parameter.

In this embodiment, the coefficient adjusting unit 138 updates the coefficients of the time-domain equalizer 134 at every symbol, but this is not a limitation of the present invention. In addition, the coefficient adjusting unit 128 adjusts the coefficients ffe_coeff2$_{m+1}$[k] of the frequency-domain equalizer 124 according to the error values err[n], and the formula is as follows:

$$\text{ffe\_coeff}2_{m+1}[k] =$$

$$\text{ffe\_coeff}2_m[k] + \sum_{n=m\times N_u}^{m\times N_u+N_u-1} u_{n,k}\text{err}[n]\text{ffe\_in}[n - D_f - k],$$

$$k = 0 \sim 199, k = 300 \sim 399$$

Figure 4A:
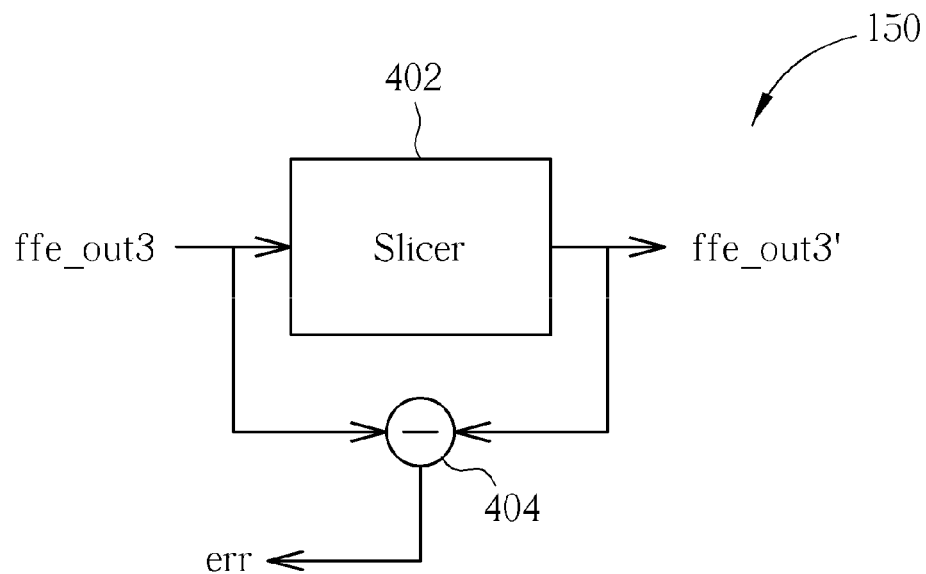
FIG. 4A is a diagram illustrating the error calculation unit shown in FIG. 1 according to one embodiment.
Figure 4B:
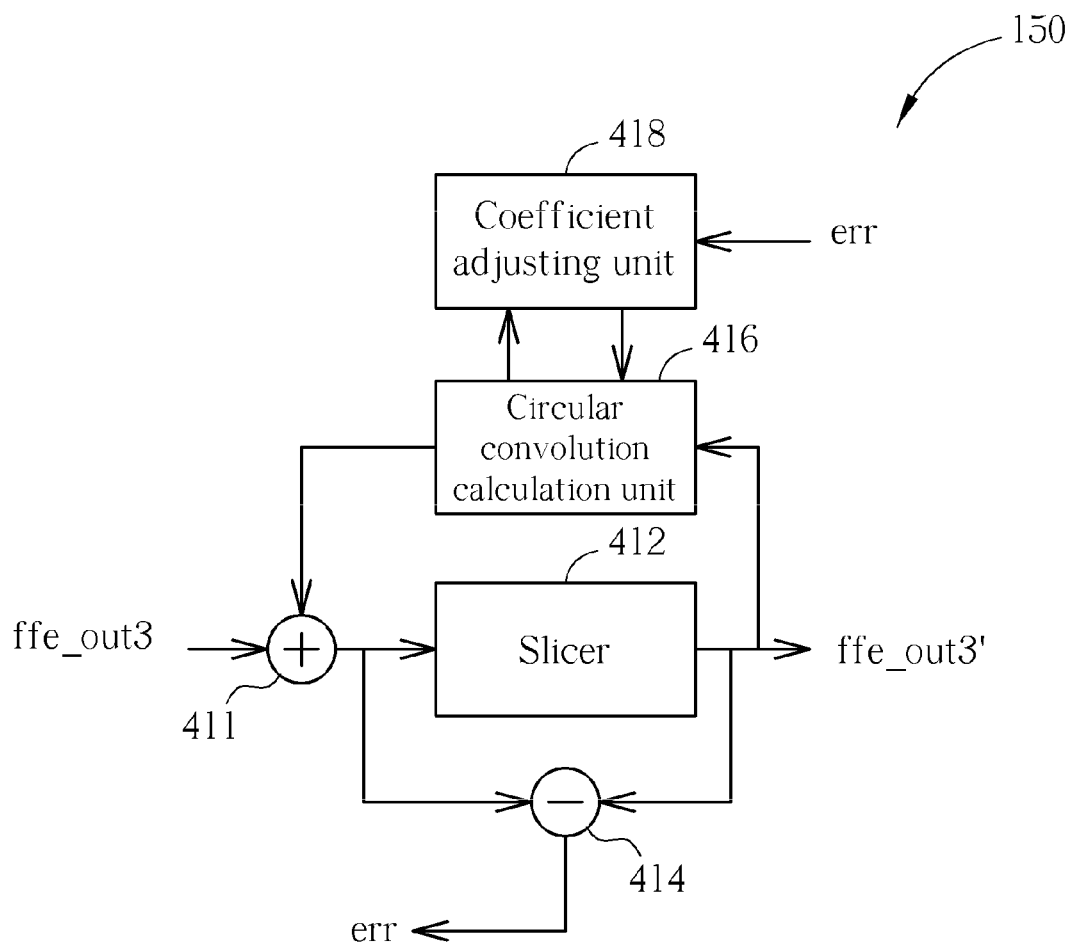
FIG. 4B is a diagram illustrating the error calculation unit shown in FIG. 1 according to another embodiment.

Please refer to FIG. 4A and FIG. 4B. FIG. 4A and FIG. 4B both show respective embodiments of the error calculation unit 150. It is noted that the embodiments shown in FIG. 4A and FIG. 4B are for illustrative purposes, and that the error calculation unit 150 can also be implemented by other circuits. Referring to FIG. 4A, the error calculation unit 150 includes a slicer 402 and a subtracter 404. In addition, referring to FIG. 4B, the error calculation unit 150 includes an adder 411, a slicer 412, a subtracter 414, a circular convolution calculation unit 416 and a coefficient adjusting unit 418. In the embodiment shown in FIG. 4A, the slicer slices the third equalized time-domain signal ffe_out3 to generate a sliced third equalized time-domain signal ffe_out3', and the subtracter 404 subtracts ffe_out3' from ffe_out3 to generate the error values err[n]. In addition, the embodiment shown in FIG. 4B is a circuit which adds a decision feedback function to the embodiment shown in FIG. 4A. A person skilled in this art should understand the operations of the embodiment shown in FIG. 4B, and further descriptions are therefore omitted here.

In this embodiment, the third equalized time-domain signal ffe_out3 is generated by adding the first equalized time-domain signal ffe_out1 and the second equalized time-domain signal ffe_out2. In other embodiments, the third equalized time-domain signal ffe_out3 can be obtained by other methods, such as performing weighting summation upon the first equalized time-domain signal ffe_out1 and the second equalized time-domain signal ffe_out2 to generate the third equalized time-domain signal ffe_out3, etc. In other words, as long as the third equalized time-domain signal ffe_out3 is generated according to the first equalized time-domain signal ffe_out1 and the second equalized time-domain signal ffe_out2, these alternative designs also fall within the scope of the disclosure.

In the embodiment shown in FIG. 1, the tap coefficients having faster changing speeds are processed by the time-domain equalizer 134, and the tap coefficients having lower changing speeds are processed by the frequency-domain equalizer 124, and each of the time-domain equalizer 134 and the frequency-domain equalizer 124 only adjusts a portion of the total tap coefficients. Therefore, as a whole, the quantity of multipliers within the equalizer can be decreased, and the equalizer achieves better signal processing quality because $$\text{ffe\_coeff1}_{n+1}[k] = \begin{cases} \text{ffe\_coeff1}_n[k] + u_{n,k}\text{err}[n]\text{ffe\_in}[n - D_f - k], & n = m \times N_u + 1 \sim (m \times N_u + N_u - 1) \\ u_{n,k}\text{err}[n]\text{ffe\_in}[n - D_f - k], & n = m \times N_u, \end{cases}$$

the tap coefficient having faster changing speeds are processed by the time-domain equalizer 134.

Figure 5:
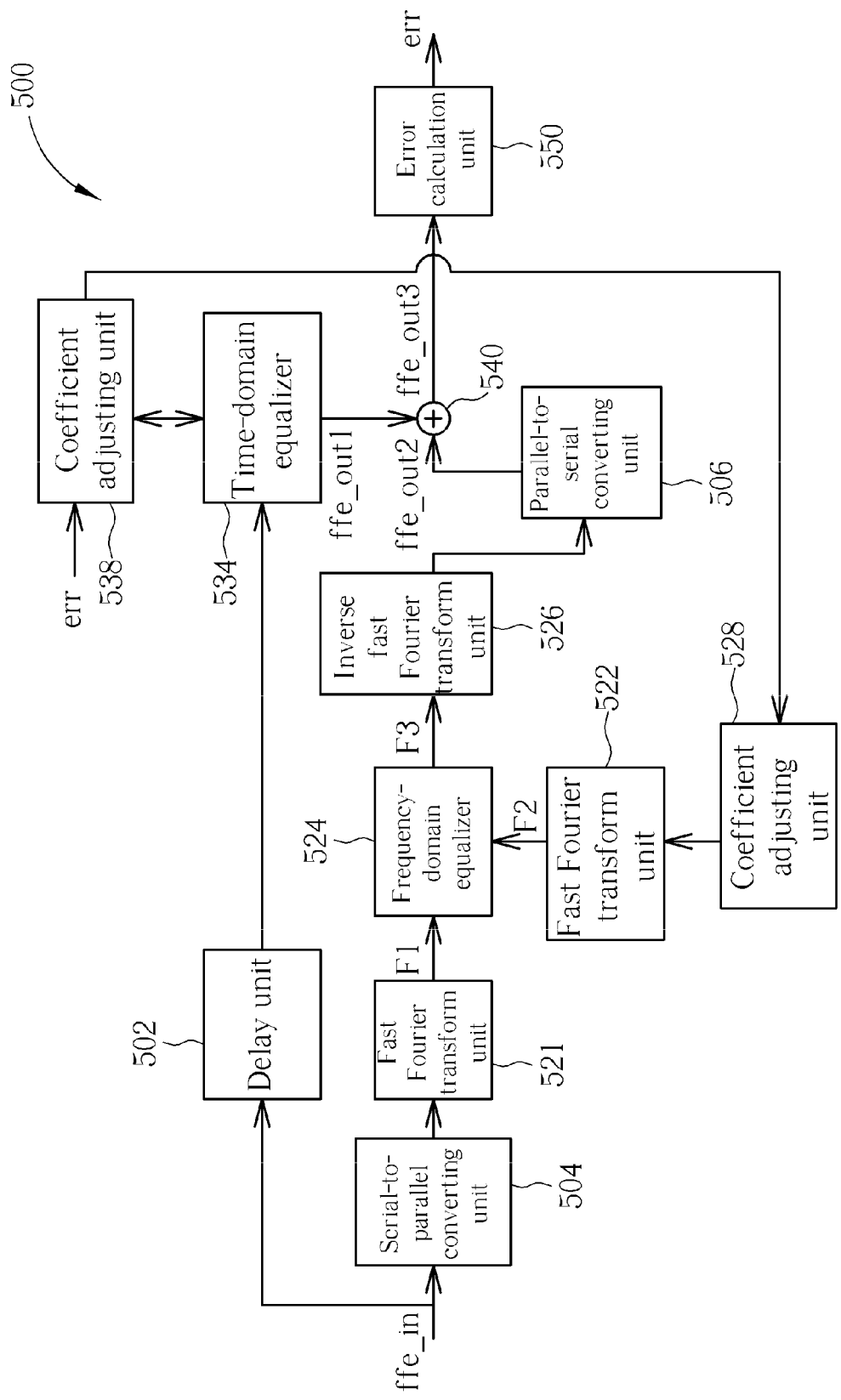
FIG. 5 is a diagram illustrating a receiver according to a second embodiment.

Please refer to FIG. 5, which is a diagram illustrating a receiver 500 according to a second embodiment. As shown in FIG. 5, the receiver 500 includes a delay unit 502, a serial-to-parallel converting unit 504, a parallel-to-serial converting unit 506, two discrete Fourier transform units (in this embodiment, two fast Fourier transform units 521 and 522 serve as the two discrete Fourier transform units), a frequency-domain equalizer 524, an inverse discrete Fourier transform units (in this embodiment, an inverse fast Fourier transform unit 526 serves as the inverse discrete Fourier transform unit), two coefficient adjusting units 528 and 538, a time-domain equalizer 534, an output circuit (in this embodiment, an adder 540 serves as the output circuit), and an error calculation unit 550. In addition, the coefficient adjusting unit 528 includes a storage unit (not shown) which stores a plurality of tap coefficients of the frequency-domain equalizer 524; and the coefficient adjusting unit 538 includes a storage unit (not shown) which stores a plurality of tap coefficients of the time-domain equalizer 534.

In this embodiment, the frequency-domain equalizer 524 and the time-domain equalizer 534 have the same number of taps. The tap coefficients of the frequency-domain equalizer 524 are updated/adjusted at each specific timing, and the tap coefficients of the time-domain equalizer 534 are updated/adjusted at every symbol. At the specific timing, the tap coefficients of the time-domain equalizer 534 are delivered to the tap coefficients of the frequency-domain equalizer 524.

The operations of the receiver 500 are similar to the operations of the receiver 100 shown in FIG. 1, and the differences are the operations of the coefficient adjusting units 528 and 538. Therefore, the following description only focuses on the coefficient adjusting units 528 and 538.

First, the coefficient adjusting unit 538 immediately adjusts the tap coefficients of the time-domain equalizer 534 according to the error values generated from the error calculation unit 550. The coefficient adjusting unit 538 adjusts the tap coefficients Tap_TE_1-Tap_TE_400. When a number the adjusted tap coefficients reaches a specific value (e.g., 2000), the coefficient adjusting unit 528 adjusts the tap coefficients Tap_FE_1-Tap_FE_400 of the frequency-domain equalizer 524 according to the tap coefficients Tap_TE_1-Tap_TE_400 stored in the storage unit of the coefficient adjusting unit 538. Many methods can be used to adjust the tap coefficients Tap_FE_1-Tap_FE_400 of the frequency-domain equalizer 524. For example, the tap coefficients Tap_TE_1-Tap_TE_400 can be summed with the tap coefficients Tap_FE_1-Tap_FE_400 of the frequency-domain equalizer 524, respectively, and then the coefficient adjusting unit 538 sets the tap coefficients Tap_TE_1-Tap_TE_400 to be "0". The tap coefficients of the time-domain equalizer 534 then continue to be adjusted and delivered to the tap coefficients of the frequency-domain equalizer 524. Using the method above, the tap coefficients of the time-domain equalizer 534 can be maintained as smaller values, and the complexity of the calculation is thereby decreased.

The tap coefficients of the time-domain equalizer 534 adjusted by the coefficient adjusting unit 538 are as follows:

and the tap coefficients of the frequency-domain equalizer 524 adjusted by the coefficient adjusting unit 528 are as follows:

$$\textit{ffe\_coeff2}_{m+1}[k] = \textit{ffe\_coeff2}_m[k] + \textit{ffe\_coeff1}_{m \times N_u N_u - 1}[k],$$

where n is a symbol index, $D_f$ is a delay amount of the delay unit 502, $$m = \left\lfloor \frac{n}{N_u} \right\rfloor,$$

$N_u$ is an equivalent block length of the linear convolution when a circular convolution is performed, and $u_{n,k}$ is a step parameter.

It is noted that the equalizer is generally categorized by a symbol-spaced equalizer and a fractional-spaced equalizer. Although the above descriptions concerning the embodiments shown in FIG. 1 and FIG. 5 use the symbol-spaced equalizer as an example, the disclosure can also be applied to the fractional-spaced equalizer or any other adaptive filters. In addition, in the embodiments shown in FIG. 1 and FIG. 5, the tap coefficients of the time-domain equalizer are updated/adjusted in every symbol; however, this is not a limitation of the disclosure. In addition, in other embodiments, the tap coefficients of the frequency-domain equalizer are not limited to be adjusted in the time domain; the tap coefficients of the frequency-domain equalizer can also be adjusted in the frequency domain. These alternative designs should fall within the scope of the disclosure.

In another embodiment, the features of the coefficient adjusting units shown in FIG. 1 and FIG. 5 can be combined. For example, the tap coefficients of the time-domain equalizer and the frequency-domain equalizer can be divided into a first block and a second block, where the method for updating/adjusting the tap coefficients within the first block is the same as the operations of the coefficient adjusting units 128 and 138 of the receiver 100: only a portion of the tap coefficients within the first block of the time-domain equalizer are set to be updated/adjusted and to be calculated, only a portion of the tap coefficients within the first block of the frequency-domain equalizer are set to be updated/adjusted and to be calculated, and the tap coefficients of the frequency-domain equalizer being updated/adjusted and the tap coefficients of the time-domain equalizer being updated/adjusted have different tap indexes. The method for updating/adjusting the tap coefficients within the second block is the same as the operations of the coefficient adjusting units 528 and 538 of the receiver 500: the tap coefficients within the second block of the frequency-domain equalizer are updated only at every specific timing, the tap coefficients within the second block of the time-domain equalizer are updated in every symbol, and the tap coefficients within the second block of the frequency-domain equalizer are adjusted according to the tap coefficients of the time-domain equalizer.

Figure 6:
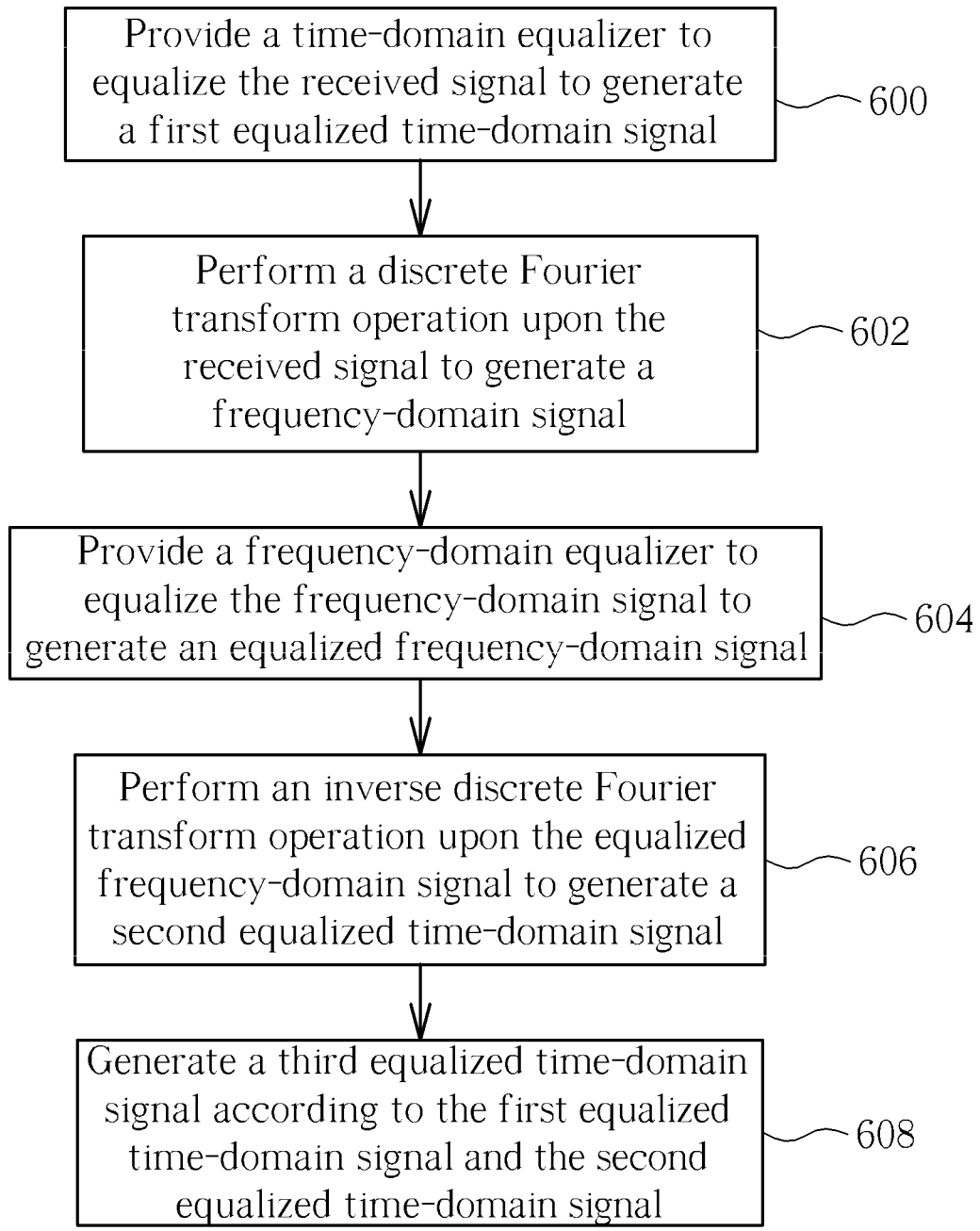
FIG. 6 is a flow chart of a method for equalizing a received signal according to one embodiment.

Please refer to FIG. 6. FIG. 6 is a flow chart of a method for equalizing a received signal according to one embodiment. It is noted that, provided the results are substantially the same, the steps are not limited to be executed according to the exact order shown in FIG. 6. Referring to FIG. 1 and FIG. 6, the flow is described as follows:

Step 600: provide a time-domain equalizer to equalize the received signal to generate a first equalized time-domain signal.

Step 602: perform a discrete Fourier transform operation upon the received signal to generate a frequency-domain signal.

Step 604: provide a frequency-domain equalizer to equalize the frequency-domain signal to generate an equalized frequency-domain signal Step 606: perform an inverse discrete Fourier transform operation upon the equalized frequency-domain signal to generate a second equalized time-domain signal.

Step 608: generate a third equalized time-domain signal according to the first equalized time-domain signal and the second equalized time-domain signal Briefly summarized, the receiver of the disclosure combines a time-domain equalizer and a frequency-domain equalizer to equalize a received signal, resulting in better signal processing quality, and reducing the number of required multipliers, which saves manufacturing costs.

Those skilled in the art will readily observe that numerous modifications and alterations of the device and method may be made while retaining the teachings of the disclosure.

What is claimed is:

1. A receiver, comprising:
   a time-domain equalizer, for equalizing a received signal to generate a first equalized time-domain signal;
   a discrete Fourier transform unit, for performing a discrete Fourier operation upon the received signal to generate a frequency-domain signal;
   a frequency-domain equalizer, coupled to the discrete Fourier transform unit, for equalizing the frequency-domain signal to generate a first equalized frequency-domain signal;
   an inverse discrete Fourier transform unit, coupled to the frequency-domain equalizer, for performing an inverse discrete Fourier transform operation upon the first equalized frequency-domain signal to generate a second equalized time-domain signal; and
   an output circuit, coupled to the inverse discrete Fourier transform unit and the time-domain equalizer, for generating a third equalizing time-domain signal according to the first equalized time-domain signal and the second equalized time-domain signal;
   wherein at least a portion of tap coefficients of the time-domain equalizer are updated in every symbol, and a portion of tap coefficients of the frequency-domain equalizer are updated every plurality of symbols.

2. The receiver of claim 1, further comprising:
   an error calculation unit, coupled to the output circuit, for generating a plurality of error values according to the third equalized time-domain signal; and
   a first coefficient adjusting unit, coupled to the time-domain equalizer, for adjusting at least the portion of tap coefficients of the time-domain equalizer according to at least a portion of error values.

3. The receiver of claim 2, wherein the first coefficient adjusting unit utilizes at least the portion of error values to adjust the portion of tap coefficients of the time-domain equalizer, and remaining tap coefficients of the time-domain equalizer are not adjusted by the error values generated from the error calculation unit, and the receiver further comprises:
   a second coefficient adjusting unit, coupled to the frequency-domain equalizer, for adjusting the portion of tap coefficients of the frequency-domain equalizer according to the portion of error values, and remaining tap coefficients of the frequency-domain equalizer are not adjusted by the error values generated from the error calculation unit.

4. The receiver of claim 3, wherein a number of taps of the frequency-domain equalizer is the same as a number of taps of the time-domain equalizer, and the tap coefficients of the time-domain equalizer being adjusted and the tap coefficients of the frequency-domain equalizer being adjusted have different tap indexes.

5. The receiver of claim 3, wherein the tap coefficients of the frequency-domain equalizer being adjusted correspond to a first region of tap indexes, the tap coefficients of the time-domain equalizer being adjusted correspond to a second region of the tap indexes, and a tap coefficient changing speed within the second region is faster than a tap coefficient changing speed within the first region.

6. The receiver of claim 2, further comprising:
   a second coefficient adjusting unit, coupled to the frequency-domain equalizer, for adjusting the tap coefficients of the frequency-domain equalizer according to the tap coefficients of the time-domain equalizer.

7. The receiver of claim 6, wherein when a number of adjusted tap coefficients of the time-domain equalizer reaches a specific value, the second coefficient adjusting unit adjusts the tap coefficients of the frequency-domain equalizer according to the tap coefficients of the time-domain equalizer.

8. A method for equalizing a received signal, comprising:
   providing a time-domain equalizer to equalize a received signal to generate a first equalized time-domain signal;
   performing a discrete Fourier operation upon the received signal to generate a frequency-domain signal;
   providing a frequency-domain equalizer to equalize the frequency-domain signal to generate act a first equalized frequency-domain signal;
   performing an inverse discrete Fourier transform operation upon the first equalized frequency-domain signal to generate a second equalized time-domain signal; and
   generating a third equalized time-domain signal according to the first equalized time-domain signal and the second equalized time-domain signal;
   updating at least a portion of tap coefficients of the time-domain equalizer in every symbol; and
   updating a portion of tap coefficients of the frequency-domain equalizer every plurality of symbols.

9. The method of claim 8, further comprising:
   generating a plurality of error values according to the third equalized time-domain signal; and
   adjusting at least the portion of tap coefficients of the time-domain equalizer according to at least a portion of error values.

10. The method of claim 9, wherein the step of adjusting at least the portion of tap coefficients of the time-domain equalizer according to at least the portion of error values comprises:

utilizing at least the portion of error values to adjust the portion of tap coefficients of the time-domain equalizer, and not adjusting remaining tap coefficients of the time-domain equalizer by the error values; and the method further comprises:

adjusting the portion of tap coefficients of the frequency-domain equalizer according to the portion of error values, and not adjusting remaining tap coefficients of the frequency-domain equalizer by the error values.

11. The method of claim 10, wherein a number of taps of the frequency-domain equalizer is the same as a number of taps of the time-domain equalizer, and the tap coefficients of the time-domain equalizer being adjusted and the tap coefficients of the frequency-domain equalizer being adjusted have different tap indexes.

12. The method of claim 10, wherein the tap coefficients of the frequency-domain equalizer being adjusted correspond to a first region of tap indexes, the tap coefficients of the time-domain equalizer being adjusted correspond to a second region of the tap indexes, and a tap coefficient changing speed within the second region is faster than a tap coefficient changing speed within the first region.

13. The method of claim 9, further comprising:

adjusting the tap coefficients of the frequency-domain equalizer according to the tap coefficients of the time-domain equalizer.

14. The method of claim 13, wherein the step of adjusting the tap coefficients of the frequency-domain equalizer according to the tap coefficients of the time-domain equalizer comprises:

when a number of adjusted tap coefficients of the time-domain equalizer reaches a specific value, adjusting the tap coefficients of the frequency-domain equalizer according to the tap coefficients of the time-domain equalizer.

15. A receiver, comprising:

a time-domain equalizer; and a frequency-domain equalizer;

wherein the time-domain equalizer and the frequency-domain equalizer equalize a received signal, and only a portion of tap coefficients of the time-domain equalizer are updated in every symbol, and the other portions of tap coefficients of the time-domain equalizer are not updated; and only a portion of tap coefficients of the frequency-domain equalizer are updated every plurality of symbols, and the other portions of tap coefficients of the frequency-domain equalizer are not updated, wherein a number of taps of the frequency-domain equalizer is the same number of taps of the time-domain equalizer, and the portions of tap coefficients of the time-domain equalizer and the portion of tap coefficients of the frequency-domain equalizer are not updated.

16. A method for equalizing a received signal, comprising:

providing a time-domain equalizer and a frequency-domain equalizer, wherein the time-domain equalizer and the frequency-domain equalizer are utilized for equalizing the received signal;

updating only a portion of tap coefficients of the time-domain equalizer in every symbol, and not updating the other portions of tap coefficients of the time-domain equalizer;

updating only a portion of tap coefficients of the frequency-domain equalizer every plurality of symbols, and not updating the other portions of tap coefficients of the frequency-domain equalizer, wherein a number of taps of the frequency-domain equalizer is the same as a number of taps of the time-domain equalizer, and the portion of tap coefficients of the time-domain equalizer and the portion of tap coefficients of the frequency-domain equalizer have different tap indexes.

\* \* \* \* \*